May 19, 1931.  F. W. SPERR, JR  1,806,370
GAS PURIFICATION PROCESS
Filed July 30, 1926  2 Sheets-Sheet 1
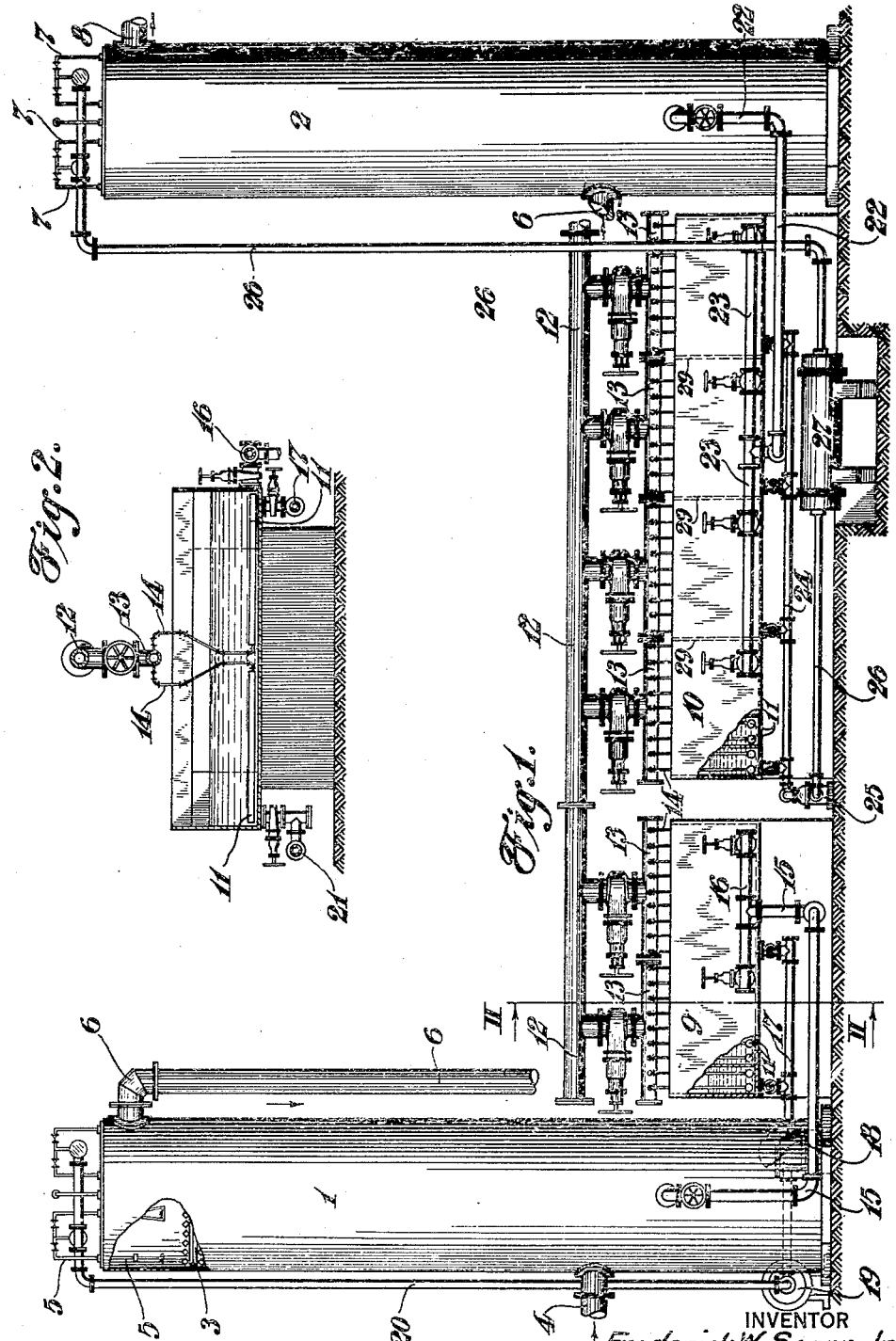
INVENTOR
Frederick W. Sperr Jr.
BY
Jesse P. Langley
ATTORNEY

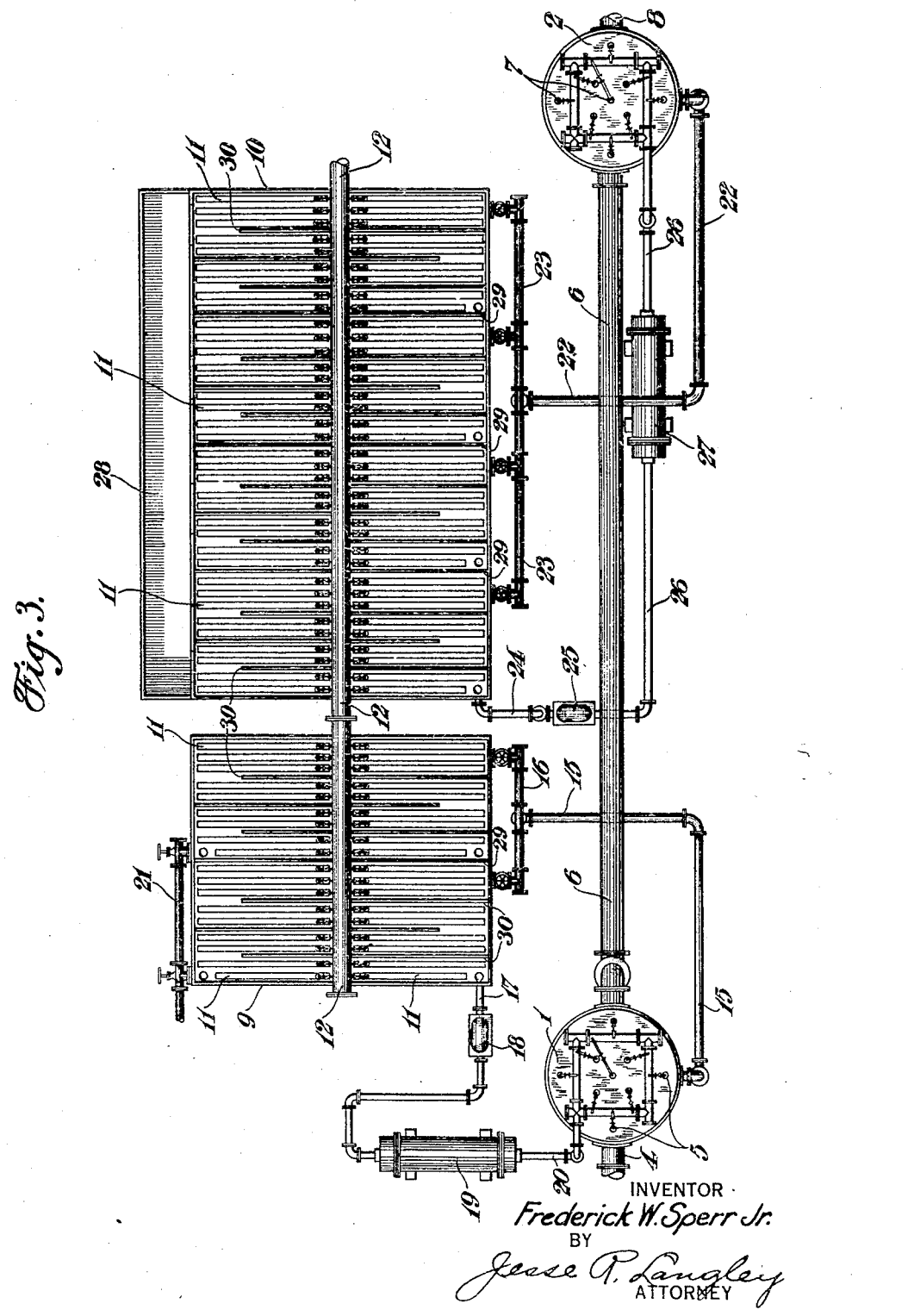

Patented May 19, 1931

1,806,370

UNITED STATES PATENT OFFICE

FREDERICK W. SPERR, JR., OF PITTSBURGH, PENNSYLVANIA, ASSIGNOR TO THE KOPPERS COMPANY, A CORPORATION OF PENNSYLVANIA

GAS PURIFICATION PROCESS

Application filed July 30, 1926. Serial No. 125,836.

My invention relates to the purification of gas containing hydrogen cyanide and hydrogen sulphide, and particularly to coal gas, coke-oven gas and other fuel gases of this character. The invention further relates to the purification of such gases by means of an alkaline solution containing nickel in form and quantity capable of promoting the oxidation of absorbed sulphides and the liberation of free sulphur under the influence of aeration.

An object of my invention is to provide a process for economically purifying fuel gas from hydrogen sulphide by means of alkaline nickel-bearing solutions.

A further object of my invention is to provide means for initially removing a constituent from fuel gas, the presence of which would militate against the success of a process employing alkaline nickel-bearing solutions.

I have observed that, in the purification of gas containing hydrogen cyanide by means of alkaline solutions which contain nickel sulphide for the purpose of promoting the oxidation of absorbed sulphides to free sulphur, the hydrogen cyanide reacts with nickel and alkali to form a soluble nickel salt. In the case of sodium carbonate as alkali, this salt appears to be a double cyanide of nickel and sodium. Unless means are provided for the recovery and utilization of this nickel compound, its formation represents a direct and serious loss of nickel. The high cost of that element renders such a loss prohibitive with respect to gas purification. To illustrate, the purification of gas containing hydrogen sulphide in moderate amount, but substantially free from hydrogen cyanide, requires the addition of approximately 0.02 lbs. of nickel sulphate (subsequently converted to sulphide in the solution) per thousand cubic feet of gas purified. Under these conditions, purification with a solution containing nickel sulphide is economical. On the other hand, purification of gas containing hydrogen cyanide requires the addition of excessive quantities of nickel compound, and renders purification of coal gas in this manner impractical.

I have found that the application of alkaline solutions containing nickel sulphide to the purification of coal gas can be economically effected if the gas is given a preliminary treatment which effectively removes the hydrogen cyanide. In my process, I provide such a preliminary purification and a subsequent treatment which completes the purification of the gas from hydrogen sulphide.

In the preliminary stage of the process of my invention, I accomplish the fixation of hyrogen cyanide by causing it to combine with the alkali and sulphur, according to the following reaction:

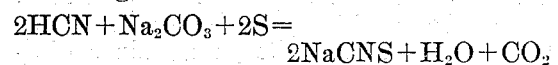
$$2HCN + Na_2CO_3 + 2S = 2NaCNS + H_2O + CO_2$$

The formation of NaCN may represent an intermediate step in this reaction.

The sulphur necessary to carry out the reaction thus generally indicated may be supplied in two ways. Either it may be caused to be formed in the solution from the oxidation and decomposition of sodium hydrosulphide produced by the absorption of hydrogen sulphide from the gas, in a manner which will be described hereinbelow, or sulphur is simply added to a solution of sodium carbonate circulated in the preliminary purification stage. In the former instance, the presence of a limited amount of an iron compound, for example, less than 0.1% of ferric sulphide, is effective in promoting the formation of sulphur. This principle of operation is further described and claimed in my copending application for Letters Patent, Serial No. 124,556, filed July 24, 1926.

In the presence of such limited quantities of iron compound, sulphur may be formed to a certain extent, but is not liberated as foam, and does not require separation, as when larger quantities of iron compound are present. In my invention, I further control the oxidation of the solution to such an extent that only the amount of sulphur necessary to combine with cyanide as thiocyanate, in the manner indicated, is produced. As this sulphur does not become a foam, or even visible, it may be regarded as nascent sulphur; it is not substantially liberated or separated as free sulphur.

I have further discovered that alkaline solutions containing iron compound exert a selectively absorbent action upon the impurities present in coal gas, as the absorption of hydrogen cyanide is complete before the bulk of the hydrogen sulphide is absorbed. Consequently, when using a solution of this character in the preliminary stage of my process, I circulate only enough of such solution over the gas to cause the removal of hydrogen cyanide. Only enough hydrogen sulphide is absorbed to provide the sulphur necessary for the fixation of the cyanide, and aeration of the solution is so limited as to insure this condition.

In the alternate instance, i. e., when no iron compound is present, and the necessary sulphur is added to the circulating solution, said solution initially consists of a 2 to 2.5 percent solution of sodium carbonate. Additions of soda and sulphur are made as necessary, and aeration is avoided except for the agitation of the solution. A certain amount of hydrogen sulphide may be absorbed, but the system is so manipulated that this will be a minimum, while substantially all of the hydrogen cyanide is absorbed from the gas and fixed as thiocyanate. In this instance, should the air emerging from the surface of the solution being agitated contain a disagreeable amount of hydrogen sulphide, it may be drawn through a hood and brought into contact with the absorbent solution of the final purification stage, before release into the atmosphere.

The gas, after being freed from substantially all of its original hydrogen cyanide content by this initial purification, is then subjected to further purification for removal of hydrogen sulphide.

In the final purification stage, the gas is subjected to contact with an alkaline solution containing nickel sulphide in suspension, in amount sufficient to liberate free sulphur, in a manner similar to that described and claimed in the copending application of Willis S. Yard et al., Serial No. 743,049, filed Oct. 11, 1924. The solution containing nickel sulphide is circulated through an absorption stage, and an actification stage wherein it is subjected to aeration with finely comminuted air, the sulphur accumulating on the surface of the liquid and being separated therefrom as necessary.

My invention consists in such other new and useful improvements and has, for further objects, such improvements in operative advantages or results as may be hereinafter found to obtain.

In order that my invention may be clearly set forth and understood, I will now describe it with reference to the accompanying drawings, which form a part of this specification and show, by way of example, a preferred form and manner in which my invention may be embodied and the preferred method by which it is accomplished.

In these drawings,

Figure 1 is a side elevational view of gas purification apparatus, parts of which have been broken away;

Fig. 2 is a sectional view of a portion of the apparatus shown in Fig. 1 and taken on the line II—II of the same; and Fig. 3 is a plan view of the apparatus shown in Fig. 1.

Similar characters of reference designate the same parts in each of the views of the drawings.

As usual in the cyclic purification of fuel gas by means of an alkaline solution, my apparatus consists, in the main, of two parts; the absorption apparatus and the actification apparatus. However, in the present instance, the purification of gas takes place in two successive stages. More specifically, the absorption of hydrogen cyanide occurs in an absorbing tower 1 and the final purification from hydrogen sulphide not removed in the tower 1 occurs in an absorbing tower 2. The towers 1 and 2 are in the path of travel of the gas and are filled with contact means 3, which may be any of the suitable forms well known in the art. The gas to be purified enters the tower 1 through a conduit 4, passes upward through the interior of the tower in countercurrent with a downwardly flowing alkaline absorbent solution of more than 2% alkalinity and carrying from 0.01 to 0.1% of iron in the form of a suitable compound, such, for example, as ferric sulphide, or a compound containing free sulphur.

The absorbent solution is introduced into the tower 1 through a plurality of sprays 5. Conditions of flow are regulated in such manner as to cause substantially complete absorption of the hydrogen cyanide present in the gas with minimum absorption of hydrogen sulphide, which may, however, take place to a certain extent. The gas freed from hydrogen cyanide passes from the tower 1 through a conduit 6 to the tower 2 for final purification.

The gas then passes upwardly through an absorber 2 and is treated in a fashion similar to its treatment in the previous tower 1, except that, in this instance, the absorbent liquid is an alkaline solution of 1 to 3% alkalinity carrying from 0.01 to 0.1% of nickel sulphide or its equivalent. This liquid is introduced into the gas flowing through the tower 2 through a plurality of sprays 7. Purification of the gas from the remaining hydrogen sulphide is accomplished before the gas escapes from the tower 2 through a conduit 8.

Inasmuch as the present invention provides two distinct absorbent solutions for purification of the gas, separate apparatus for the revivification of these solutions has been provided. Such apparatus consists in an actification tank, or thionizer 9, for the actification of the solution recirculated through the tower 1, and a thionizer 10 for the actification of the solution recirculated through the tower 2. Construction of the thionizers 9 and 10 is similar, except that the latter is larger and is provided with a foam trough, or launder 28 to facilitate the removal of sulphur liberated during the actification.

The thionizers 9 and 10 are both provided with partitions which subdivide them into a plurality of normally non-communicating compartments and each of these compartments is further subdivided by suitable baffles into a plurality of communicating parts, generally referred to as "passes". Within and adjacent to the bottom of each pass of the thionizers 9 and 10 are horizontally disposed porous tubular aerators 11. These are preferably of the form described and claimed in copending application for U. S. Letters Patent of Gilbert E. Seil, Serial No. 21,978, filed April 9, 1925, but other suitable aerators may be used.

Compressed air is supplied to the aerators 11 from a header 12, sub-headers 13, of which there is one for every compartment of the thionizers, and individual supply lines 14, and passes through the aerators 11 in finely comminuted form into the liquid maintained within the thionizers.

The solution that is passed downwardly through the tower 1 in contact with the gas collects in the lower part of the tower and flows, by gravity, through a sealed conduit 15 and header 16 into the one or more of the compartments of the thionizer 9. The fouled solution is subjected to sufficient aeration to cause the dissolved cyanides present to be oxidized to sodium thiocyanate and/or to thoroughly agitate the solution. After revivification, the solution leaves the thionizer 9 through a manifold conduit 17 and is forced, by pump 18, through a heater 19, which serves to maintain a temperature of above 80° F. in the solution entering the tower 1. The solution is then forced through a conduit 20 into the plurality of sprays 5, by means of which the solution is again distributed to the interior of the tower 1.

As the concentration of the sodium thiocyanate in the solution rises, it becomes desirable to withdraw a portion of the solution. Portions of the said solution are easily withdrawn through a drain manifold 21. The withdrawn liquid may be discarded, or treated to recover the dissolved salts by any suitable process. The loss in volume due to withdrawal is made up by adding further quantities of freshly prepared solution.

The alkaline nickel-bearing solution used for purification of the gas in the tower 2, after contact with the gas, accumulates in a sulphided state in the lower portion of the tower 2 and flows by gravity through a sealed conduit 22 and a header 23 into one or more of the compartments of the thionizer 10. During its passage through the thionizer 10, the solution is thoroughly aerated by means of air introduced through the aerators 11 and the sulphides present are immediately oxidized to free sulphur which is caused to float in the form of froth, or foam, which is allowed to pass off into the launder 28.

The rejuvenated solution passes out of the thionizer 10 through a manifold 24 and is forced by a pump 25 through a conduit 26 and a heater 27 into the plurality of sprays 7 which re-distribute the solution to the interior of the tower 2. The sulphur removed from the thionizer 10 may be treated, as necessary, to recover a saleable product. A portion of this sulphur is retained for addition to the thionizer 9 to promote the formation of thio-compounds therein, when other means for insuring the presence of sulphur have not been employed.

My invention takes advantage of the superior properties of alkaline solutions containing nickel sulphide for effecting the removal and oxidation of the bulk of impurities present in the gas while effecting a preliminary removal of hydrogen cyanide that is dangerous to the nickel catalyst by means of a process which is adapted to economically and substantially completely remove this impurity.

While I have set forth and described my invention with relation to a particular embodiment and a particular procedure, it will be understood that such embodiment and such procedure are given for the purpose of exemplification, and I do not limit myself to such specific examples, except as specified in the claims hereinafter made.

I claim as my invention:

1. The process of purifying gas containing hydrogen cyanide and hydrogen sulphide which comprises purifying said gas to an extent sufficient to remove the hydrogen cyanide and subsequently subjecting the gas to contact with an alkaline solution containing nickel sulphide for the removal of the bulk of the hydrogen sulphide.

2. The process of purifying gas containing hydrogen cyanide and hydrogen sulphide which comprises subjecting said gas to contact with an alkaline liquid to an extent sufficient to remove substantially all of said hydrogen cyanide, removing said liquid and aerating it in the presence of sulphur to such extent as to cause the absorbed impurities to be oxidized to soluble thio-compounds, and subsequently subjecting the gas to contact with an alkaline nickel-bearing liquid for the removal of hydrogen sulphide not removed by said preliminary purification.

3. In a process of purifying gas by means of alkaline solutions containing nickel sulphide, the step which comprises removing HCN from the gas prior to contact with such solutions.

In testimony whereof, I have hereunto subscribed my name this 27th day of July 1926.

FREDERICK W. SPERR, Jr.